(12) United States Patent
Howard et al.

(10) Patent No.: US 6,300,437 B1
(45) Date of Patent: *Oct. 9, 2001

(54) POLYMERIZATION PROCESS

(75) Inventors: Philip Howard, Middlesex; Peter James Maddox; Stephen Roy Partington, both of Surrey, all of (GB)

(73) Assignee: BP Chemicals Limited (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/904,437

(22) Filed: Jul. 31, 1997

Related U.S. Application Data

(63) Continuation of application No. 08/669,800, filed on Jun. 27, 1996, now abandoned, which is a continuation of application No. 08/410,986, filed on Mar. 27, 1995, now abandoned.

(30) Foreign Application Priority Data

Apr. 7, 1994 (GB) .................................................. 9406895
Aug. 26, 1994 (GB) .................................................. 9417365

(51) Int. Cl.$^7$ .................................................... C08F 4/42
(52) U.S. Cl. ............ 526/160; 526/123.1; 526/129; 526/127; 526/130; 526/901; 526/943
(58) Field of Search ............................. 526/123.1, 129, 526/127, 130, 160, 901, 943

(56) References Cited

U.S. PATENT DOCUMENTS 5,218,071 * 6/1993 Tsutsui et al. ...................... 526/348
5,272,236 * 12/1993 Lai et al. .......................... 526/348.5
5,296,565 * 3/1994 Ueda et al. ......................... 526/114
5,374,700 * 12/1994 Tsutsui et al. ..................... 526/348.3

FOREIGN PATENT DOCUMENTS 0452920   10/1991  (EP) .
9308221    4/1993  (WO) .

OTHER PUBLICATIONS

Kaminsky, "Metallocene Catalysts" SP'92–Polyethylene World Congress, Dec. 1992.*

* cited by examiner

*Primary Examiner*—David W. Wu
*Assistant Examiner*—Ling-Siu Choi
(74) *Attorney, Agent, or Firm*—Morgan & Finnegan LLP (57) ABSTRACT

A process for preparing polyolefins having at least 0.01 long chain branches (LCB)/1000 carbon atoms along the polymer backbone as measured by flow activation and a molecular weight distribution greater than 2.5 comprises polymerization in the presence of a metallocene complex having the formula:

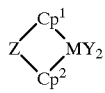

wherein $Cp^1$, $Cp^2$ are independently a substituted or unsubstituted indenyl or hydrogenated indenyl group, Y is a univalent anionic ligand, M is zirconium, titanium or hafnium, and Z is a bridging group comprising an alkylene group having 1 to 20 carbon atoms or a dialkyl silyl- or germyl- group, or alkyl phophine or amine radical. Polyolefins prepared from such a process show specific flow activation energy/LCB relationships.

9 Claims, 3 Drawing Sheets

POLYMERIZATION PROCESS

This application is a continuation, of application Ser. No. 08/669,800, filed Jun. 27, 1996 now abandoned, which is a continuation, of application Ser. No. 08/410,986, filed Mar. 27, 1995, now abandoned.

The present invention relates to a process for preparing polyolefins, in particular to a process for preparing polyolefins having a degree of long chain branching and which show improved processability.

Polyethylenes produced from conventional Ziegler catalysts have a narrower molecular weight distribution than those produced using for example conventional chromium catalysts and generally show only average processability. For example conventional linear low density polyethylene (LLDPE) prepared using titanium based catalysts show a poorer processability than low density polyethylenes (LDPE).

Polyethylenes produced using conventional metallocene catalysts eg bis(cyclopentadienyl) zirconium systems have an even narrower molecular weight distribution and also show processability problems eg melt fracture, low melt tension etc.

In order to improve processability the breadth of molecular weight distribution may be increased or the degree of long chain branching in the polymer may be increased. Products exhibiting higher shear thinning whilst maintaining impact properties etc. are desirable. It is advantageous however that any such improvement in processability can be achieved by polymerisation the gas phase.

Several attempts have been made to improve processability. WO 93/08221 discloses the use of specific constrained geometry catalysts to introduce long chain branching to give increased processability at narrow molecular weight distributions.

EP 452920 discloses the use of a series of prepolymerised bridged metallocene catalysts which result in a narrow composition distribution and an increase in melt tension for improved bubble stability.

Another solution to improve processability is to blend a LLDPE (prepared using a conventional Ziegler catalyst) with a LDPE (prepared using a high pressure free radical process) to obtain the benefits of the LLDPE mechanical properties with the LDPE processability. However blending may introduce problems eg degradation, colour, antioxidants and properties such as heat seal may be reduced due to poor mixing or incompatibility of multi-component systems.

We have now found that by using specific metallocene complexes as catalysts polymers may be produced in the gas phase in a single step which show properties consistent with a blend of LDPE and LLDPE.

Thus according to the present invention there is provided a process for producing polyolefins which have at least 0.01 long chain branches/1000 carbon atoms along the polymer backbone (as measured by flow activation) and a breadth of molecular weight distribution ($M_w/M_n$) greater than 2.5 said process comprising polymerising an olefin monomer or monomers in the presence of a catalyst comprising a metallocene complex having the general formula:

wherein
Cp$^1$, Cp$^2$ are independently a substituted or unsubstituted indenyl or hydrogenated indenyl group,

Y is a univalent anionic ligand,
M is zirconium, titanium or hafnium, and
Z is a bridging group comprising an alkylene group having 1 to 20 carbon atoms or a dialkyl silyl- or germanyl-group, or alkyl phophine or amine radical.

Preferred complexes are those in which M is zirconium.

The univalent anionic ligands are suitably hydrogen, halide, hydrocarbyl, alkoxide, amide or phosphide and are preferably halide.

When Z is an alkylene group it has preferably 2 carbon atoms.

A particularly preferred metallocene complex is $C_2$-bridged bis(indenyl) zirconium dichloride represented by the formula:

The metallocene for use in the present invention may be used in the presence of a suitable co-catalyst. Suitably the co-catalyst is an organometallic compound having a metal of Group 1A, IIA, IIB or IIIB of the periodic table. Preferably, the metals are selected from the group including lithium, aluminium, magnesium, zinc and boron. Such co-catalysts are known for their use in polymerisation reactions, especially the polymerisation of olefins, and include organo aluminium compounds such as trialkyl, alkyl hydride, alkyl halo and alkyl alkoxy aluminium compounds. Suitably each alkyl or alkoxy group contains 1 to 6 carbons. Examples of such compounds include trimethyl aluminium, triethyl aluminium, diethyl aluminium hydride, triisobutyl aluminium, tridecyl aluminium, tridodecyl aluminium, diethyl aluminium methoxide (MAO), diethyl aluminium ethoxide, diethyl aluminium phenoxide, diethyl aluminium chloride, ethyl aluminium dichloride, methyl diethyoxy aluminium and methyl aluminoxane. The preferred compounds are alkyl aluminoxanes, the alkyl group having 1 to 10 carbon atoms, especially methyl aluminoxane. Suitable co-catalysts also include Bronsted or Lewis acids.

The in-situ co-catalyst may be mixed with the metallocene, optionally on an inorganic support. Alternatively, the co-catalyst may be added to the polymerisation medium along with the metallocene complex. Suitably, the amount of co-catalyst mixed with the metallocene complex may be such as to provide an atom ratio (M) from the metallocene to the metal in the co-catalyst of 1–10,000:10,000–1 for aluminoxanes and 1–100:100–1 otherwise.

Catalyst supports may comprise a single oxide or a combination of oxides. They may also be physical mixtures of oxides. The supports may have a high surface area (250–1000M$^2$/g) and a low pore volume (0–1 ml/g) or a low surface area (0–250M$^2$/g) and high pore volume (1–5 ml/g) or preferably high surface area (250–1000M$^2$/g) and high pore volume (1–5 ml/g) (mesoporous). Preferred support materials are silica, alumina, titania, boria and anhydrous magnesium chloride or mixtures thereof, although any support used in heterogeneous catalysis/polymer catalysis may be employed.

The support may undergo a pretreatment to modify its surface eg thermal or chemical dehydroxylation or any combination of these, using agents such as hexamethyldisilazane and trimethylaluminium. Other reagents that can be used are triethyaluminium, methylaluminoxane and other aluminium containing alkyls, magnesium alkyls especially dibutyl magnesium and alkyl magnesium halides, zinc alkyls and lithium alkyls. Different impregnation regimes may be used to add the surface treatment and subsequent metallocene impregnation. Metallocene or metallocene/cocatalyst may be added to the support or other supported polymerisation catalyst before, during or after surface treatment to modify the support/catalyst surface or any combination of these. Impregnation may take place sequentially or in a number of separate steps or in a single step using any method known in the prior art including vapour phase treatment/impregnation techniques.

The olefin polymerisation catalyst used in the process according to the present invention may be used to produce both homopolymers or copolymers using solution polymerisation, slurry polymerisation or gas phase polymerisation techniques. Suitably alpha olefins used in copolymerisation may be those having up to 20 carbon atoms in particular butene-1, hexene-1, 4-methyl pentene-1 or octene-1. Methods and apparatus for effecting such polymerisation reactions are well known and described in, for example, named *Encycopaedia of Polymer Science and Engineering* published by John Wiley and Sons, 1987, Volume 7, pages 480 to 488 and 1988, Volume 12, pages 504 to 541. The catalyst according to the process of the invention can be used in similar amounts and under similar conditions to known olefin polymerisation catalysts.

The polymerisation may optionally be carried out in the presence of hydrogen. Hydrogen or other suitable chain transfer agents may be employed in the polymerisation to control the molecular weight of the produced polyolefin. The amount of hydrogen may be such that the percentage of the partial pressure of hydrogen to that of olefin(s) is from 0.01–200%, preferably from 0.01–10%.

Typically, the temperature is from 30 to 110° C. for the slurry or "particle form" process or for the gas phase process. For the solution process the temperature is typically from 30 to 250° C. The pressure used can be selected from a relatively wide range of suitable pressure, eg from subatmospheric to about 350 MPa. suitably, the pressure is from atmospheric to about 6.9 MPa, or may be from 0.05–10, especially 0.14 to 5.5 MPa. In the slurry or particle form process, the process is suitably performed with a liquid inert diluent such as a saturated aliphatic hydrocarbon. Suitably the hydrocarbon is a $C_4$ to $C_{10}$ hydrocarbon, eg isobutane or an aromatic hydrocarbon liquid such as benzene, toluene or xylene. The polymer is recovered directly from the gas phase process, by filtration or evaporation from the slurry process and by evaporation from the solution process.

The invention will now be further illustrated by reference to the following Examples which illustrate the preparation of supported complexes suitable for use in the present invention and polymerisations using such complexes together with comparative examples.

Preparation of Complexes
Catalyst Preparation for Examples 1–5, 8–9 and 12

A solution of MAO in toluene (2.45M, 6.4 ml, 15.7 mmol) was contacted with a slurry of Crofield ES70 silica (2.2 g, pre-dried in $N_2$ at 800° C.) in toluene (20 ml). The slurry was stirred for 1 hour and the toluene removed in vacuo. The MAO-impregnated silica was then re-slurried in toluene (20 ml) and a solution of $C_2$ bridged bis(indenyl) zirconium dichloride (EBIZr) (0.104 mmol in toluene) was added and stirred for 1 hour. Finally the toluene was removed in vacuo to give a dry catalyst.

Catalyst Preparation for Example 6

6.1 g of silica (pre-dried in $N_2$ at 800° C.) was slurried with 7.63 ml of TMA (2M, in hexane) plus 16.8 ml of toluene and then stirred for 1 hour. The hexane was removed under vacuo, at room temperature, to leave dry silica powder. A solution of MAO in toluene (2.65M, 6.2 ml, 16.5 mmol) was added to EBIZr (0.11 mmol) and further diluted with toluene (9 ml) and then heated to 62° C. to dissolve the metallocene. This solution was contacted with a portion of the TMA treated silica (2.2 g) again at 62° C. The slurry was stirred for 1 hour at 62° C. and the toluene was then removed in vacuo.

Catalyst Preparation for Examples 7 and 10–11 and 13

A solution of MAO in toluene (2.65M, 6.2 ml, 16.5 mmol) was added to EBIZr (0.11 mmol). The resultant solution was diluted further with toluene (9 ml) and heated to a temperature of 62° C. This solution was slurried with silica (2.2 g, pre-dried under $N_2$ at 800° C.) which was also at 62° C. The slurry was stirred for 1 hour before the toluene was removed in vacuo to leave a dry powder.

Catalyst Preparation for Examples 14–16

Ethylene bridged bis(tetrahydroindenyl) zirconium dichloride [EBTHI] (0.1 mmol) was dissolved in a toluene (7.9 ml) solution of methyl aluminoxane (15.0 mmol) and added to a Schlenk tube containing calcined ES70 silica (2.0 g) to form a slurry. The slurry was stirred at ambient temperature for 1 hr and the toluene removed under vacuum to leave a dry air sensitive solid.

Catalyst Preparation for Examples 17–18

To 2.0 g of ES70 silica, previously calcined to 800° C. in $N_2$, was added a solution of $Me_2Si$-indenyl$_2ZrCl_2$ (44.8 mg, 0.1 mmol) dissolved in a toluene solution of MAO (6.38 ml, 2.35M, 15.0 mmol) and an additional 1.5 ml of dry toluene at 50° C. The slurry ws thoroughly mixed by stirring for 1 hr at 50° C. after which the solvent was removed in vacuum to leave a dry, free flowing, orange powder.

Catalyst Preparation for Example 19

17 mol of MAO (10% in toluene, WITCO) and 119 mM EBIZr in 2.31 toluene were maintained at room temperature with stirring for 15 min. 2 kg of silica (SD3217.50 dried at 800° C., 5 h) was added to the mixture to form a suspension. The resulting mixture was stirred for 1 h at room temperature, the suspension transferred to a drier and the solvent removed at 120° C. to provide a free-flowing spherical powder.

Catalyst Preparation for Comparative Example 20

A solution of MAO in toluene (2.45M, 6.4 ml, 15.7 mmol) was added to a slurry of ES70 silica (2.2 g, pre-dried in $N_2$, 800° C.) in toluene (20ml). This was stirred for 1 hour, and the toluene removed in vacuo. The MAO impregnated ES70 was reslurried in toluene (20 ml), and a solution of bis(2-propenyl)-cyclopentadienyl zirconium dichloride (0.104 mmol) in toluene was added, and stirred for 1 hour.

Catalyst Preparation for Comparative Example 21

A solution of MAO in toluene (2.45M, 6.4 ml, 15.7 mmol) was added to a slurry of ES70 silica (2.2 g, pre-dried in $N_2$, 800° C.) in toluene (20 ml). This was stirred for 1 hour, and the toluene removed in vacuo. The MAO impregnated ES70 was re-slurried in toluene (20 ml), and a solution of bis (cyclopentadienyl) zirconium dichloride (0.104 mmol) in toluene was added, and stirred for 1 hour.

Polymerisations
Polymerisation for Examples 1–18 and comparative Examples 20–21

The catalysts were tested in a stirred batch gas phase reactor.

The autoclave was heated to 75° C.–80° C. under a flow of $N_2$ (2l/min) for a minimum of 1 hour before salt (300 g, pre-dried under vacuo at 150° C.) was added. Trimethylaluminium (2 ml, 2M in hexane) was used to scavenge for poisons in the autoclave for ½ hour before being purged from the reactor over a 20–30 minute period using a flow of $N_2$(2l/min).

The catalyst (usually 0.2–0.5 g diluted with dried silica, 1.5 g) was injected, under nitrogen, directly into the autoclave vessel which was at a steady state of 73° C., 8 bar ethylene (an ethylene pressure of 12 bar was used in Example 18). Hexene-1 was also present for the copolymerisation studies whilst hydrogen was used for the homopolymerisation in Example 9. In Example 18 trimethylaluminium was present in the gas phase (2 $cm^3m$ 2M in hexane). The pressures of hexene-1 and hydrogen used in each test are shown in the accompanying Tables. No diluent was used for injecting the catalyst in Examples 10, 11, 12, 13, 15 and 18 and comparative Examples 20, 21 and 22.

After the injection of the catalyst the temperature was adjusted to 75° C. for all tests except Example 13 where a temperature of 80° C. was used. During the polymerisation, the ethylene-was fed at a rate sufficient to keep the total pressure of the autoclave constant. The hexene-1 and hydrogen were fed at the required rate to keep the $H_2/C_2$ and $C_6/C_2$ ratios constant. These ratios were measured by on line mass spectral analysis. Hexene-1 was added to the autoclave via an HPLC pump and the hydrogen and ethylene addition were regulated by mass flow controllers. The catalysts were tested for between 1–4 hours under these conditions before termination of the reaction by venting of the reactant vapour, nitrogen purge and lowering of the temperature to 40° C.

Polymerisation for Example 19

Ethylene, n-hexene and nitrogen were fed into a continuous fluidised bed reactor of diameter 45 cm maintained at a total pressure of 1.9 MPa and a temperature of 80° C. The gas composition was maintained constant PC6/PC2=0.5% and supported catalyst for Example 16 injected into the reactor continuously at a rate of 7g/h to maintain a constant reaction rate in the reactor. Polymer product was continuously removed from the reactor through a valve as copolymer of density 0.920 $g/cm^3$ non annealed, MI=0.6 g/10 min. The polymer exhibits long chain branching (0.23 per 1000 C), and very good morphology properties (bulk density =0.45$g/cm^3$, less than 1% particles less than 125 $\mu m$).

The reaction conditions were varied to prepare different types of polymer.

Polymerisation for Comparative Examples 22–25

The following polymers were used. Examples 22,24: LDPE from high pressure free radical process. Example 23,25: LLDPE from gas phase process using titanium based Ziegler catalyst.

The following details exemplify the procedures for the preparation of films from polymers prepared according to Examples 10, 19, 24 and 25.

The results for all the above polymerisations are given below in Tables 1 and 2.

Preparation of Film from Polymer of Example 10 and Comparative Examples 24 and 25

Ex-reactor powders were compounded into stabilised pellet feedstock (300 ppm Irganox 1010, 800 ppm Irgafos 168 and 500 ppm Irgafos PEPQ) using an APV MP2015 15 mm co-rotating twin screw extruder at a screw speed of 150 rpm, throughput of 0.6–0.9 kg/hr and melt temperature of 220–225° C. Film was blown using an Axon BX18 18 mm single screw blown film line fitted with a 30:1 L/D ratio screw and 1.0 mm die-gap. Films were produced using typical commercial LLDPE processing conditions of 38 $\mu m$ thickness, 2:1 blow up ratio and 225° C. melt temperature at throughputs of 3–6 kg/hr.

The results are given below in the accompanying Table 3.

Preparation of Film from Polymer of Example 19

Ex-reactor powders were compounded into stabilised (same package as in Example 10 above) pellet feedstock using a Werner ZSK 53 at a screw speed of 75 rpm, throughput of 22.7 kg/hr and melt temperature of 226° C. The film was produced using a Kiefel RO40 blown film extruder fitted with a 40 mm, 25 L/D screw using a die of diameter 200 mm with a die-gap of 2.5 mm. Films of 38 $\mu m$ thickness were produced using 2:1 blow up ratio, 109 bar of melt pressure at throughputs of 24 kg/hr. The film obtained shows the characteristics of a LDPE/LLDPE blend in particular dart impact=163 g, elongation at break =610% (MD) and 760% (TD).

The measurement of the parameters MI, Mw/Mn, SCB, LCB density, Falling Dart Impact, Tear Shrinkage, Gloss and Haze, given in the Tables were determined as follows:

Melt Index (2.16 kg)

The melt index of the polymers was measured under conditions which conform to ISO 1133 (1991) and BS 2782:PART 720A:1979 procedures. The weight of polymer extruded through a die of 2.095 mm diameter, at a temperature of 190° C., during a 600 second time period and under a standard load of 2.16 kg is recorded.

Mw/Mn

Mw and Mn were determined by GPC analysis of the polymers. The GPC analysis was carried out on a Waters 150-CV Gel Permeation Chromatograph using Namas Method of test 210/gpc/2 "Determination of polymer molecular weights by GPC using 124 Trichlortobenzene (TCB) as eluent at elevated temperatures". Calculation of Mw and Mn was by using Waters Expert Ease software.

Long Chain Branching (LCB) Measurements

Various techniques (eg $^{13}$C NMR, GPC/LALLS, GPC/intrinsic viscometry, GPC/on-line viscometry and rheological flow activation energy, etc) have been developed for the determination of the degree of long chain branching in polymers. However, there are various difficulties associated with these available experimental methods and the theoretical basis of the calculations used to extract LCB from the experimental data is virtually never rigorous for the polymer systems of interest. Thus, it is difficult to be certain whether the calculated degree of LCB actually reflects that present in the polymer system. In addition, these techniques are likely to be responding differently to differing LCB architectures in the polymers. Thus, by combining such techniques information about the structure of the polymer may be obtained. These techniques, as described below, have used to characterise the examples of this invention and the conventional LDPEs and LDPE/LLDPE blends.

GPC/Instrinsic Viscometry Method for LCB Characterisarion

GPC

A Waters 150 CV was used for molecular weight determination. The relevant operating conditions were: temperature =140° C.; mobile phase=1,2,4-Trichlorobenzene stabilised with 200 ppm Santanox R, flow rate=0.5 ml/min; injection volume =500 $\mu l$; columns=1×Shodex AT-807/S, 1×Shodex AT-806M/S, 1×Shodex 804/S, 1×Waters Ultrastyragel 500 A, detector=Refractive Index (DRI); concentrations typically 0.05% w/v.

The system was calibrated using 24 polystyrene standards supplied by Polymer Laboratories, converted to polyethylene molecular weights by Universal Calibration using the Mark Houwink parameters $k_{ps}=1.21\times10^{-4}$, $a_{ps}=0.707$, $k_{pe}=4.48\times10^{-4}$, $a_{pe}=0.718$ [H. Coll and D. K. Gilding, J.Polymer Sci A-2 8, 89 (1970) and A. Cervenka, Die Makromol. Chem., 170, 239 (1973)], 8 narrow molecular weight polyethylenes supplied by NIST, Washington, USA and Polymer Laboratories and 12 linear hydrocarbons $C_5H_{12}$ to $C_{104}H_{210}$. A small shift, constant in terms of percentage, was applied to the polystyrene molecular weights so that the calibration gave Mw=54 000, 2 000 for an analysis of the widely accepted polyethylene standard SRM1475 (supplied by NIST), hence the polystyrenes were used to characterise the shape of the calibration, while SRM1475, the narrow distribution PE's and the hydrocarbons define its absolute position.

Solution Viscometry

Solution viscometry was undertaken using Ubbelhohde viscometers (Schott 530-01) at 140° C. The solvent was 1, 2, 4-Trichlorobenzene stablised with 200 ppm Santanox R. The samples were prepared to a concentration of 0.1 % w/v and the method described by J. H. Elliott, K. H. Horowitz and T. Hoodcock, [J. Appl. Polym. Sci. 14, 2947 (1970)], was followed to give intrinsic viscosity [η].

The long chain branch parameter, $g'_{LCB}$, was calculated from the GPC and intrinsic viscosity data using equations from standard texts e.g. Th.G.Scholte, Chapter 1, Developments in Polymer Characterisation-4 [edited by J. V. Dawkins, Applied Science Publishers Ltd (1983)]. Combining equations 24 and 59 from that article the following equation is found:

$$g'_{LCB}=[\eta]/([\eta]_{GPC}\times g'_{SCB}),$$

where [η] is the measured intrinsic viscosity of the long chain branched polymer, $[\eta]_{GPC}$ is the intrinsic viscosity predicted for a linear polymer with the same GPC elution trace as the long chain branch polymer being characterised, and $g'_{SCB}$ is the contribution to the g' parameter arising from comonomer incorporation rather than LCB. The latter quantities were calculated as follows:

$$[\eta]_{GPC}=0.00048\times M_v^{0.718},$$

where $M_v$ is the viscosity average molecular weight calculated from the GPC trace, assuming a=0.718, and, $$g'_{SCB}=(1-S)^{1.718},$$

where S is the weight fraction of the polymer present as short side branches. For copolymers made by catalysts, S was obtained directly from measurements of comonomer content. For LDPE materials it was assumed the $g'_{SCB}=0.92$.

The number of branch points per molecule, n, was then calculated by solving the following equation which was derived from equations 6 and 27 of Scholte, using b=0.8:

$$g'_{LCB}=\{6/n[0.5((2+n)/n)^{0.5}\ln\{((2+n)^{0.5}+n^{0.5})/((2+n)^{0.5}-n^{0.5})\}-1]\}^{0.8}$$

The level of LCB per 1000 carbon atoms was calculated as $$LCB=(14000\times n)/M_w$$

where $M_w$ is the weight average molecular weight of a linear polymer having the same GPC elution trace as the long chain branched polymer being characterised.

Flow Activation Energy Method

The rheology of polymer melts depends strongly on temperature and on the underlying molecular structure (e.g. molecular weight, molecular weight distribution and long chain branching). The temperature dependence of viscosity, or flow activation energy ($E_a$), has been established empirically (J K Hughes, SPE Antec Tech Papers, 29 (1983) 306) for the quantification of the average level of long chain branching (LCB) in polyethylenes. $E_a$ can be calculated from the Rheometrics oscillatory rheological data measured at different temperatures, based on the Boltzmann time-temperature superposition principle (using the Rheometrics Rhios 432 software with 2D shifts) to determine the shift factor ($a_T$) which is related to $E_a$ by an Arrhenius-type equation:

$$a_T=\exp[E_a/R(1/T-1/T_o)]$$

where R is the gas constant and $T_o$ is the reference temperature to which the rheological data (eg G', G" and tan δ) at temperature T are shifted horizontally and vertically onto to form a master curve.

The relationship between the flow activation energy, $E_a$ and the average level of LCB is given as:

$$LCB=[\{(E_a/4.186)-6.24\}/(7.93\times10^5)]\times(1.4\times10^4)$$

where $E_a$ is in kJ/mol and LCB is the number of long chain branches per 1000 carbons.

Dynamic Rheological Measurement

Long chain branching in the homopolymer and copolymers was determined by dynamic rheological characterisation. An antioxidant package was used to stabilise the polymers during compression moulding to prepare sample for the dynamic rheological characterisation. This antioxidant package was Irganox 1001 (300 ppm), Irgafos 168 (800ppm), Irgafos PEPQ (500 ppm).

These stabilisers were added to 0.5 g of polymer and placed in a mould with 25 mm diameter holes of depth 1 mm. The mould was transferred to a Moore press preheated to 190° C. and compression moulded under the following conditions: 3 minutes at contact pressure of 10 kg/m² followed by 5 minutes at 20 tons; then cooled rapidly, under 20 tons pressure, to room temperature with cooling water.

The bulk dynamic rheological properties (eg G', G" and η*) of all the polymers were measured at 180°, 200° and 220° C. using Rheometrics RDS-2 Dynamic rheometer. At each temperature, scans were performed as a function of angular shear frequency (from 100 to 0.01 rad/s) at a constant shear strain of 5% using 25 mm diameter parallel plates. It is a prerequisite that all the experiments are performed within the linear viscoelastic response region so that the oscillatory rheological measurements do not induce structural changes to the polymer during testing.

Density

Density measurements were made using a water/methanol column according to method ISO 1183. Samples were conditioned for 24 hours at 23° C. before measurement. The reported density value in each case is the average of 3 readings expressed to the nearest 0.1 kg/m³

Falling Dart Impact (FDI)

Falling Dart Impact strength was determined by dropping a hemispherical-headed dart from a specific height using a Davenport Dart Impact tester according to BS 2782: Method 352D. All samples were conditioned at 23° C/50% RH for 24 hours prior to testing at room temperature. The dart weight was increased until a 50% failure rate was obtained over 10 tests. The reported FDI value is the mass in grammes (to the nearest 5 g) of the dart required to rupture 50% of the specimens tested.

Tear Strength

The Tear Strength was measured using an electronic Elmendorf Tester according to ASTM D1922. Film samples were conditioned at 23° C./50% RH for 24 hours prior to testing and were tested at room temperature. 8 samples of each polymer were cut from the layflat film, in both the MD and TD. The thickness of each specimen was measured at 3 points along the tear axis and an average thickness value recorded. The reported tear strength value is the average of the 8 readings corrected for thickness and expressed in grammes/25 μm to the nearest gramme.

Shrinkage

Shrinkage was measured using a Techne themostatically controlled oil bath according to the standard procedure PIFA 5.81. A test temperature of 130° C. was used in each case. For each material 6 MD and TD specimens 10 mm×100 mm long were cut from the layflat film. Each specimen was then placed into the pre-heated oil bath for 45 seconds and then removed and allowed to cool in a flat position. The reported shrinkage value in each direction is the average of the 6 readings expressed as a percentage.

Haze

Haze properties were measured using a pre-calibrated EEL Spherical Hazemeter fitted with a digital galvanometer according to BS2782:Method 515A. Film samples were conditioned at 23° C./50%RH for 24 hours prior to testing and were tested at room temperature. The reported value is for total haze and is an average value of 10 readings expressed as a pecentage reported to the nearest 0.1%.

Gloss

Gloss was measured using a pre-calibrated Plastec B 45° glosshead fitted with a digital galvonometer according to BS2782.Method 515B. Pre-calibration was carried out using a standard gloss tile with reference gloss value of 51 Plastec units. Film samples were conditioned at 23° C./50%RH for 24 hours prior to testing at room temperature. 10 measurements were made in both the TD and MD for each film sample. The reported gloss value is an average of the 20 readings expressed to the nearest whole number in "Plastec Units" (Pu).

Examples 1–18, Table 1, show how the product of the invention contains long chain branching (LCB) as determined by flow activation and has a Mw/Mn greater than 2.5. The LCB is produced in a single reactor, from a single catalyst component in the gas phase, without the need for prepolymerisation. The LCB is produced in the presence and absence of hydrogen and comonomer. The amount of LCB is affected by the amount of hydrogen, amount of comonomer, the catalyst type and may also be affected by the temperature, ethylene partial pressure and the time on stream. The width of the molecular weight distribution may also be dependent on factors such as the hydrogen pressure, the comonomer pressure and the ethylene pressure, temperature and catalyst type.

The consequences of the LCB and increased Mw/Mn are shown by improved processability compared to conventional LLDPE eg reduced power for extrusion, higher melt tension, increased bubble stability, increased blow ratio, reduced melt fracture and improved product properties such as shrink, opticals and heat seal. The product gives properties comparable to a mixture of LLDPE and LDPE. Conventionally blends of LLDPE and LDPE are often used to give the above improved properties. However, this adds to costs, by having to melt blend products from two separate and different processes, with problems of degradation, the need to add additives, colour and inferior properties such as heat seal which can result from the poor mixing of multi-component systems.

BRIEF DESCRIPTION OF THE DRAWINGS

The invention will be further illustrated with reference to the accompanying Figures.

FIG. 1 shows how the product of the invention has improved shear thinning compared to other single component catalysts. FIG. 2 shows that this shear thinning is maintained from homo and copolymer products of the invention. FIG. 3 shows how the product of the invention has increased shear thinning compared to conventional Ziegler products. This Figure shows that the product of the invention, from a low pressure gas phase catalyst, has shear thinning normally associated with products from high pressure radical processes. All comparisons were carried out at 200° C.

Figure 1:
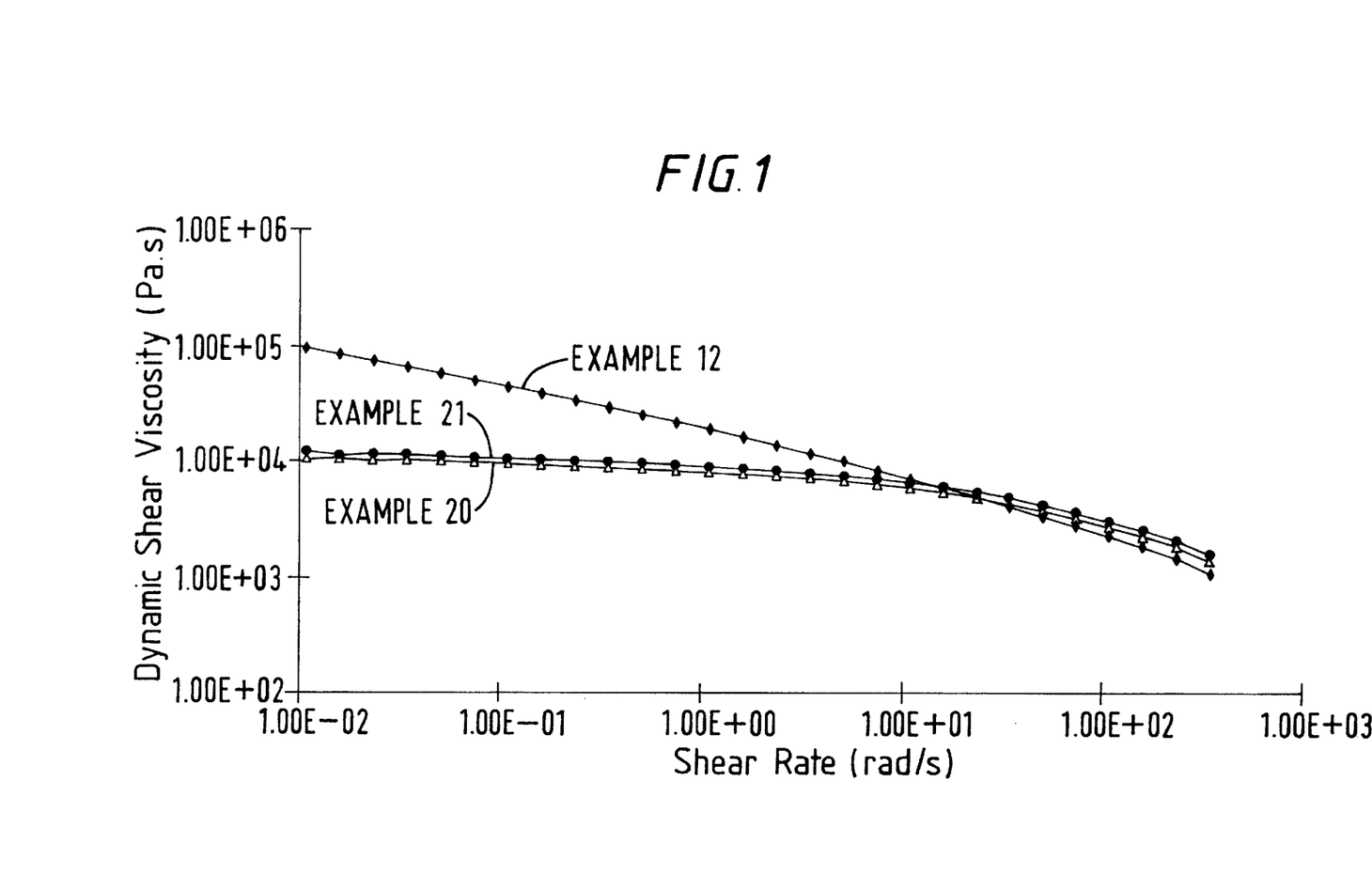
FIG. 1 is a graph of the dynamic shear viscosity (measured in Pa.s) for Examples 12, 20 and 21 as a function of shear rate (measured in rad/s).
Figure 2:
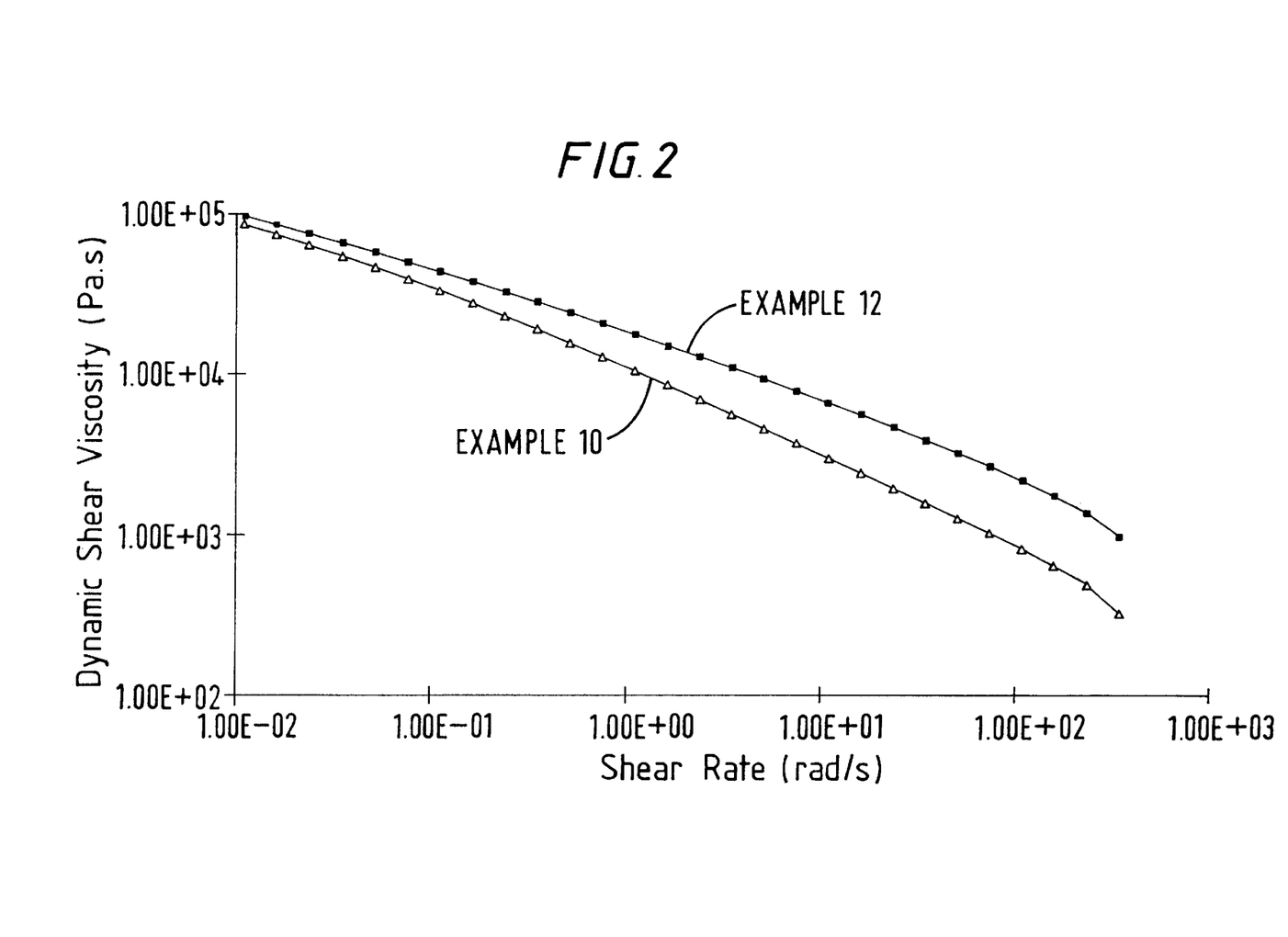
FIG. 2 is a graph of the dynamic shear viscosity (measured in Pa.s) for Examples 10 and 12 as a function of shear rater (measured in rad/s).
Figure 3:
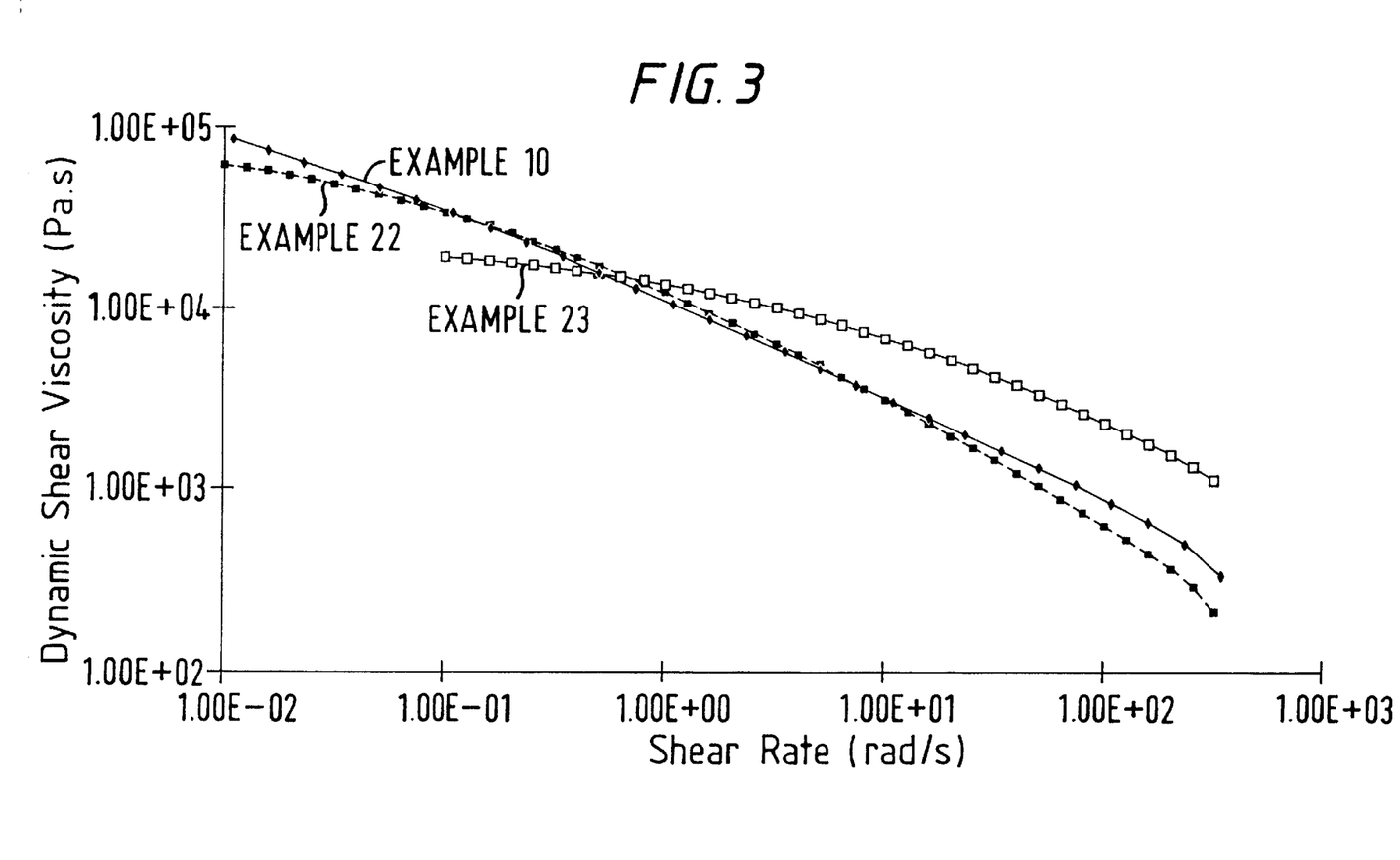
FIG. 3 is a graph of the dynamic shear viscosity (measured in Pa.s) for Examples 22 and 23 as a function of shear rate (measured in rad/s).

Table 3 shows how the product of the invention gives reduced power consumption in film blowing compared to a Ziegler catalysed product. The film from the product of this invention gives shrink and optical properties normally associated with LDPE products or blends of these products with Ziegler catalysed products.

TABLE 1

| Example | Catalyst Type | Temperature (° C.) | Hexene (Absolute bar) | Hydrogen (Absolute bar) | Length of run (minutes) | Polymer Yield (g) | $MI_{(2.16\ kg)}$ (dg/min) | PD $M_w/M_n$ | LCB* (/1000 C.) |
|---|---|---|---|---|---|---|---|---|---|
| 1 | EBI | 75 | 0.2 | 0 | 60 | 49 | 6.2 | 2.7 | 0.15 |
| 2 | EBI | 75 | 0 | 0 | 60 | 35 | <0.1 | 3 | — |
| 3 | EBI | 75 | 0.07 | 0 | 70 | 84 | 0.15 | 3.7 | 0.247 |
| 4 | EBI | 75 | 0.12 | 0 | 240 | 57 | 6.2 | 3 | — |
| 5 | EBI | 75 | 0.06 | 0 | 240 | 59 | 0.45 | 4.8 | — |
| 6 | EBI | 75 | 0.08 | 0 | 240 | 256 | 1.6 | 4.2 | 0.188 |
| 7 | EBI | 75 | 0.1 | 0 | 240 | 106 | 10 | — | 0.177 |
| 8 | EBI | 75 | 0.03 | 0 | 240 | 85 | — | 5.9 | 0.568 |
| 9 | EBI | 75 | 0 | 0.08 | 120 | 54 | — | — | 0.08 |
| 10 | EBI | 75 | 0.06 | 0 | 180 | 275 | 0.3 | — | 0.25 |
| 11 | EBI | 75 | 0.07 | 0 | 160 | 186 | — | — | — |
| 12 | EBI | 75 | 0 | 0 | 60 | 60 | — | — | 0.15 |

TABLE 1-continued

| Example | Catalyst Type | Temperature (° C.) | Hexene (Absolute bar) | Hydrogen (Absolute bar) | Length of run (minutes) | Polymer Yield (g) | MI$_{(2.16\ kg)}$ (dg/min) | PD M$_w$/M$_n$ | LCB* (/1000 C.) |
|---|---|---|---|---|---|---|---|---|---|
| 13 | EBI | 80 | 0.06 | 0 | 40 | 159 | — | — | 0.30 |
| 14 | EBTHI | 75 | 0.31 | 0 | 60 | 45 | — | 3.3 | — |
| 15 | EBTHI | 75 | 0 | 0 | 120 | 38 | — | — | 0.06 |
| 16 | EBTHI | 75 | 0.09 | 0 | 60 | 58 | 2 | 2.9 | 0.04 |
| 17 | SBI | 75 | 0.08 | 0 | 120 | 76 | 1.4 | 3.8 | 0.15 |
| 18 | SBI | 75 | 0.08 | 0 | 120 | 85 | 1.7 | — | 0.135 |

EBI = C2 — bridged bis(indenyl) zirconium dichloride
EBTHI = C2 — bridged bis(tetrahydroindenyl) zirconium dichloride
SBI = dimethylsilyl bis-indenyl zirconocene dichloride
NB. A hyphen indicates that the particular parameter was not measured.
*LCB as determined by the flow activation method

TABLE 2

COMPARATIVE EXAMPLES

| Example | Catalyst Type | Temperature (° C.) | Hexene (Absolute bar) | Hydrogen (Absolute bar) | Length of run (minutes) | Polymer Yield (g) | MI$_{(2.16\ kg)}$ (dg/min) | PD M$_w$/M$_n$ | LCB* (/1000 C.) |
|---|---|---|---|---|---|---|---|---|---|
| 20 | Propenyl | 75 | 0 | 0 | 180 | 230 | — | — | <0.02 |
| 21 | bis-Cp | 75 | 0 | 0 | 70 | 43 | — | — | <0.03 |
| 22 | Radical | — | — | — | N/A | — | 0.17 | — | 0.30 |
| 23 | Ziegler | — | — | — | N/A | — | 0.16 | — | <0.03 |
| 24 | Radical | — | — | — | N/A | — | 1 | — | — |
| 25 | Ziegler | — | — | — | N/A | — | 1 | — | — |

*LCB as determined by the flow activation method

TABLE 3

POLYMER USED FOR FILM BLOWING

| Properties & Processing | | Comparative Example 24 | Example 10 | Comparative Example 25 |
|---|---|---|---|---|
| Melt Index (2.16 kg @ 190° C.) | g/10 min | 1 | 0.3 | 0.86 |
| Density | g/cm³ | 0.917 | 0.916 | 0.918 |
| Film Blowing | | | | |
| Melt temperature | ° C. | 225 | 225 | 225 |
| Screw speed | rpm | 220 | 150 | 220 |
| Line speed | m/min | 7.6 | 3.8 | 5.4 |
| Motor current | amps | 10.5 | 11.5 | 16.5 |
| Normalised current (4.5 kg/h) | amps | 9.5 | 10.8 | 17.3 |
| Film Properties | | | | |
| Falling Dart Impact | g | 120 | 210 | 210 |
| MD tear strength | g/25 microns | 94 | 179 | 307 |
| TD tear strength | g/25 microns | 136 | 237 | 496 |
| TD strinkage | % | 27 | 29 | −10 |
| MD strinkage | % | 69 | 47 | 58 |
| Gloss | Pu | 56 | 58 | 50 |
| Haze | % | 9 | 11 | 15 |

The polymers produced according to the process of the present invention have at least 0.01 long chain branches/1000 carbon atoms along the polymer backbone as determined by flow activation and a breadth of molecular weight distribution greater than 2.5.

The products may suitably be further characterised and distinguished from conventional LDPEs and LDPE/LLDPE blends by the relationship between the flow activation energy ($E_a$) and the degree of long chain branching/1000 C atoms as determined from GPC-Intrinsic viscosity measurements.

The values of the flow activation energy and long chain branching for a number of examples according to the present invention compared to commercial LDPE and LDPE/LLDPE blends are given in Table 4.

TABLE 4

| Example | Flow Activation* Energy $E_a$ (kJ/mol) | LCB (GPC/SV)** (/1000C) |
|---|---|---|
| 3 | 84.65 | 0.37 |
| 6 | 70.81 | 0.47 |
| 7 | 53.91 | 0.63 |
| 8 | 160.8 | 0.25 |
| 10 | 85.59 | 0.49 |
| 12 | 61.67 | 0.01 |
| LDPE | | |
| Shell: 25010FA | 66.77 | 1.04 |
| BP: LD5310AA | 60.74 | 1.11 |
| Exxon: LD380 | 59.57 | 0.94 |
| LDPE/LLDPE Blends A B C | | |
| A (80% Shell 25010FA + 20% BP LL7209AA) | 59.19 | 0.75 |
| B (60% Shell 25010FA + 40% BP LL7209AA) | 55.55 | 0.72 |
| C (20% Shell 25010FA + 80% BP LL7209AA) | 36.92 | 0.18 |

*Measured by time-temperature superposition of Rheometrics dynamic rheological data)
**Long Chain Branching as measured by GPC/Solution Viscometry Method)

Thus according to another aspect of the present invention there is provided a homopolymer of ethylene or copolymer of ethylene with an alpha olefin having from 3 to 20 carbon atoms characterised in that the homopolymer or copolymer has:

(a) a flow activation energy ($E_a$) in the range $30 \leq E_a \leq 500$ kJ/mol, and
(b) a degree of long chain branching (LCB/1000 C) as measured by GPC/solution viscometry satisfies the equation.

$$LCB \leq 0.03 E_a - 1.5$$

Preferably the copolymers have an activation energy in the range $50 \leq Ea \leq 200 KJ/mol$ and a degree of long chain branching as measured by GPC/solution viscometry in the range $$LCB \leq 0.03 E_a - 1.5 \text{ and } LCB \geq 0.2.$$

and the homopolymers have an activation energy in the range $50 \leq E_a \leq 200$ KJ/mol and a degree of long chain branching as measured by GPC/solution viscometry in the range $$LCB \leq 0.03 E_a - 1.5 \text{ and } LCB \leq 0.1.$$

We claim:
1. A process for the preparation of a copolymer of ethylene and an alpha-olefin having from 3 to 20 carbon atoms characterised in having

(a) a flow activation energy ($E_a$) in the range $50 \leq E_a \leq 200$ kJ/mol,
(b) a degree of long chain branching (LCB/1000C) as measured by GPC/solution viscometry in the range $0.25 \leq LCB \leq 0.03\ E_a - 1.5$ and
(c) a breadth of molecular weight distribution $M_w/M_n$ greater than 2.5, said process comprising polymerising in a gas phase ethylene and an alpha-olefin having from 3 to 20 carbon atoms in the presence of an unprepolymerized supported catalyst comprising a metallocene complex having the general formula:

wherein
$Cp^1$, $Cp^2$ are independently a substituted or unsubstituted indenyl or hydrogenated indenyl group,
Y is a univalent anionic ligand,
M is zirconium, titanium or hafnium, and
Z is a bridging group comprising an alkylene group having 1 and 20 carbon atoms or a dialkyl silyl- or germanyl-group, or alkyl phophine or amine radical.

2. A process according to claim 1 wherein M is zirconium.
3. A process according to claim 1 wherein the metallocene complex has the formula:

4. A process according to claim 1 wherein the metallocene complex is used in the presence of a co-catalyst.
5. A process according to claim 4 wherein the co-catalyst is an organo aluminium compound.
6. A process according to claim 5 wherein the organo aluminium compound is methyl aluminoxane.
7. A process according to claim 1, wherein the metallocene complex is supported on silica, alumina or magnesium dichloride.
8. A process according to claim 1 performed in the gas phase.
9. A process according to in claim 1 wherein $Cp^1$ and $Cp^2$ are independently unsubstituted indenyl or hydrogenated indenyl groups.

* * * * *